Figure 1B:
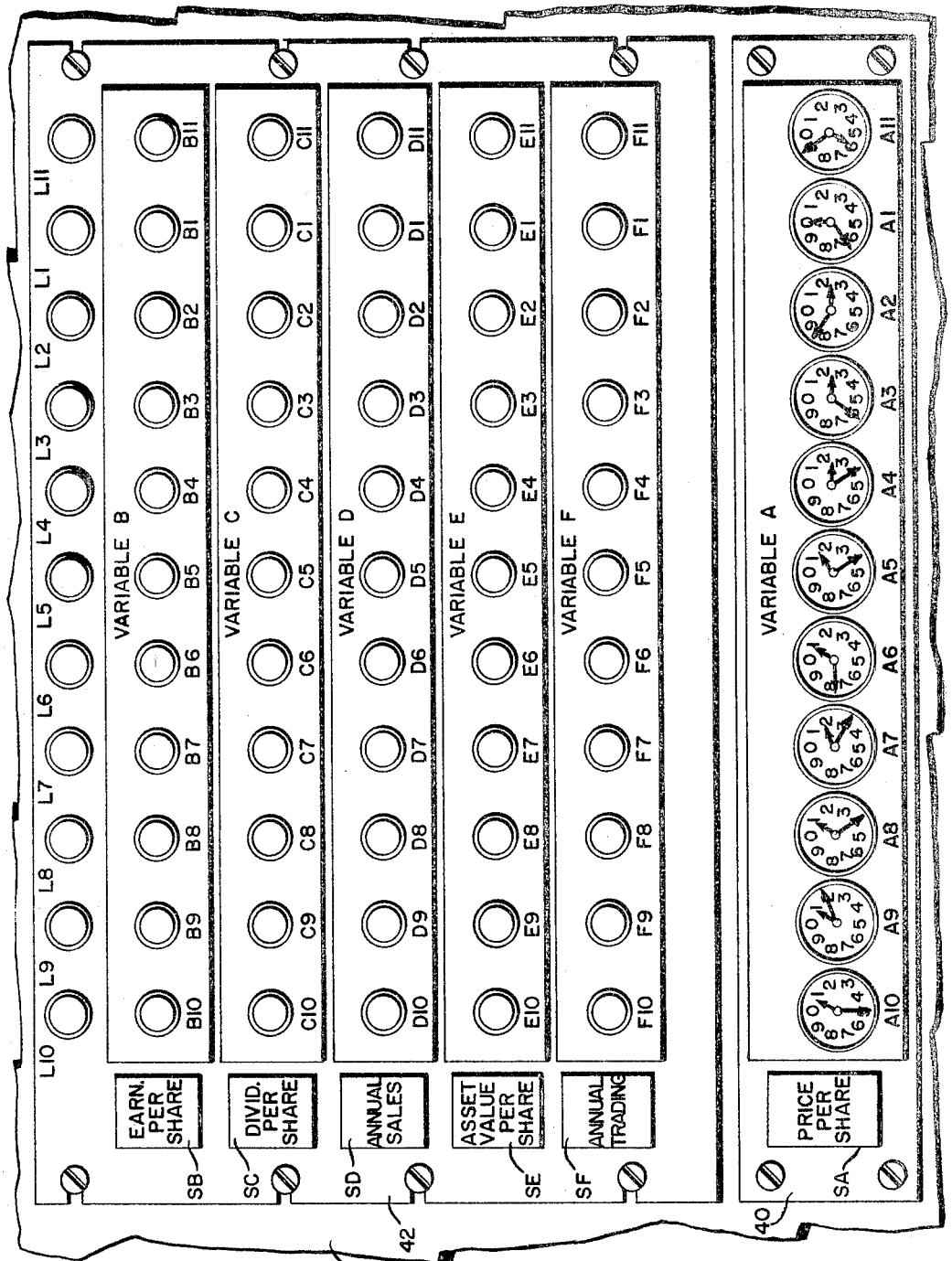

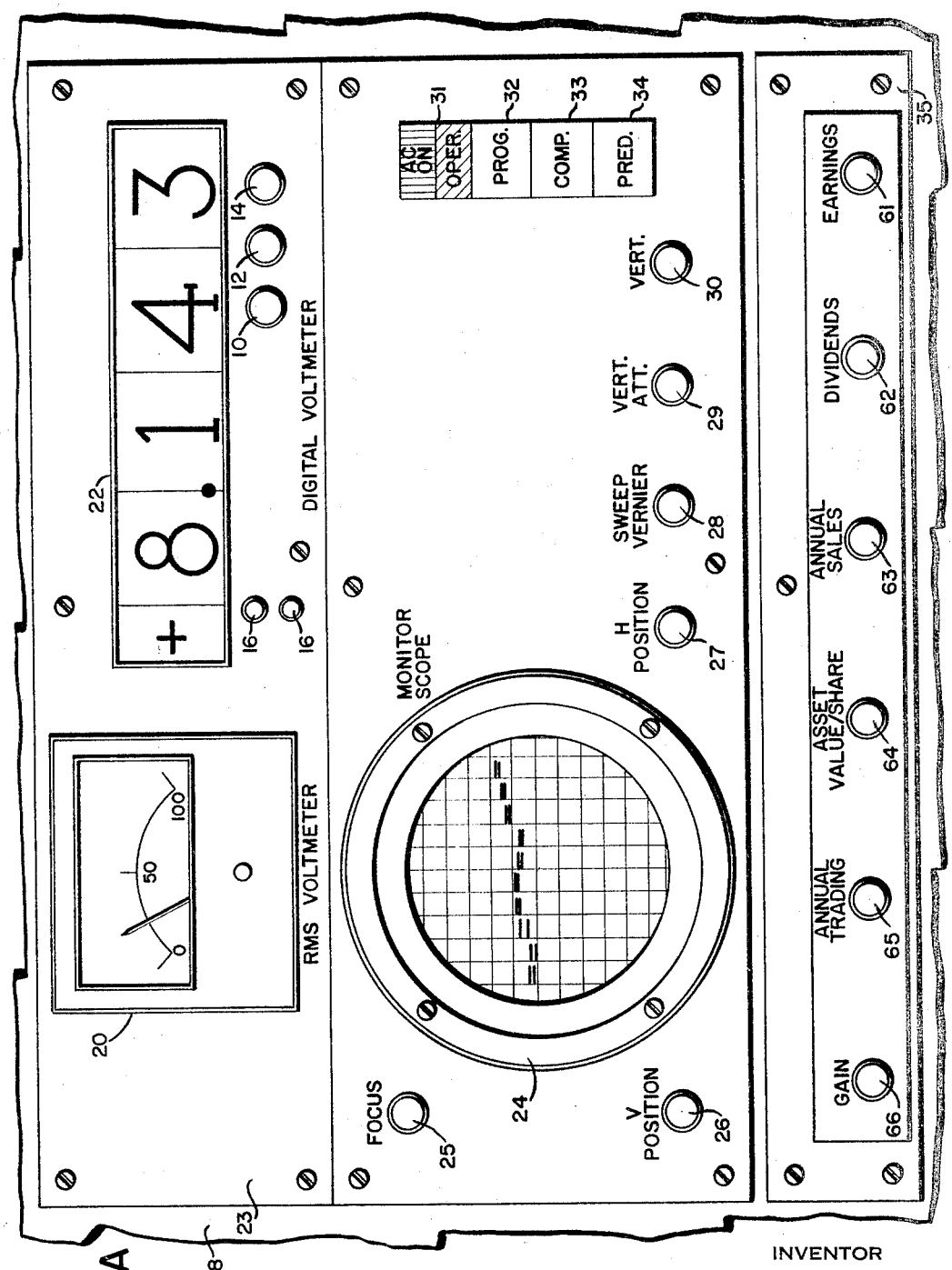
FIG. IA
INVENTOR
JOHN M. LAMBERT
ATTORNEY

INVENTOR
JOHN M. LAMBERT
BY
ATTORNEY

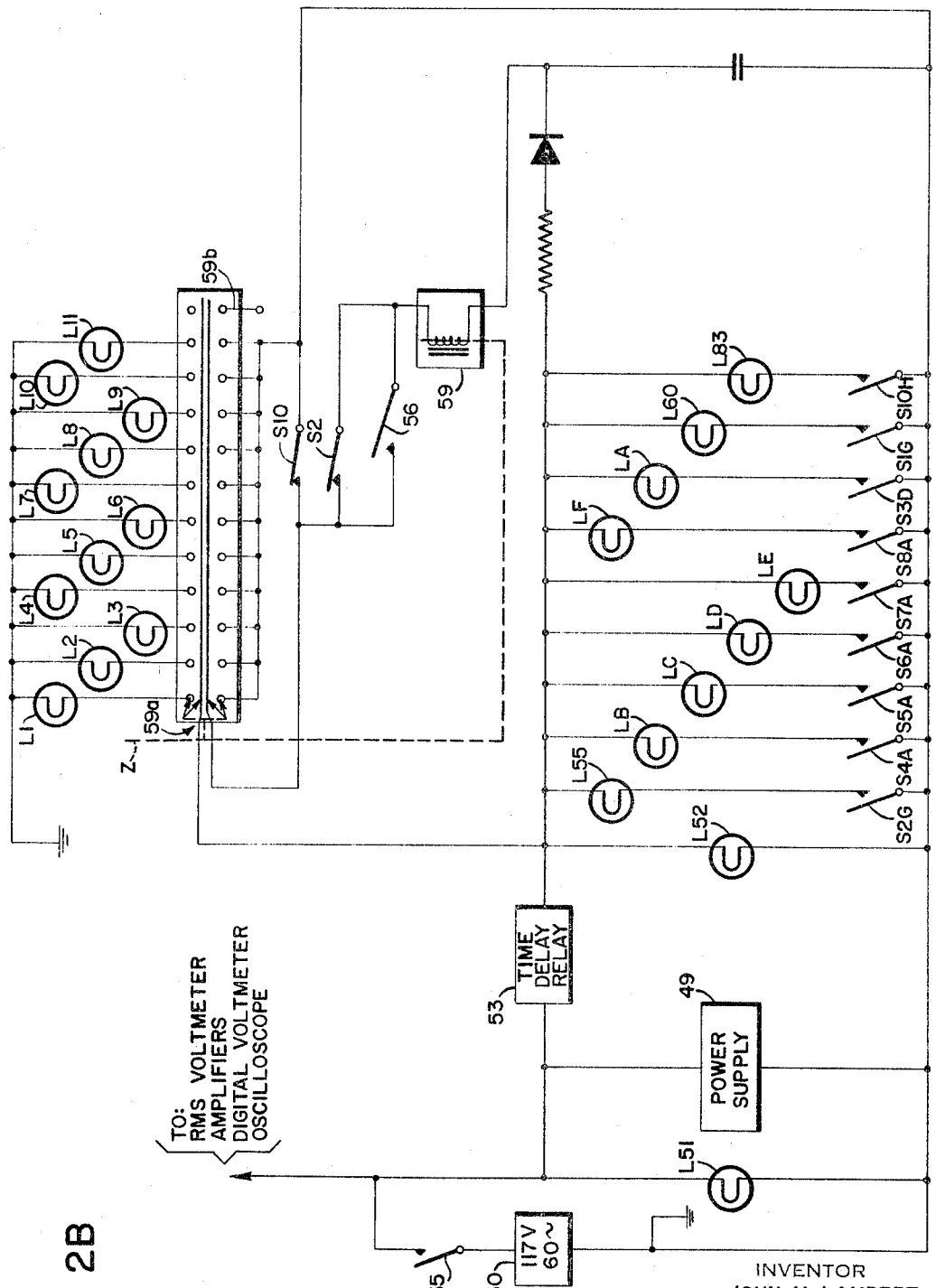

United States Patent Office 3,270,190
Patented August 30, 1966

3,270,190
SECURITIES EVALUATOR
John M. Lambert, Northport, N.Y., assignor to Electronic Stock Evaluator Corp., Northport, N.Y., a corporation of New York
Filed Oct. 1, 1962, Ser. No. 227,250
11 Claims. (Cl. 235—194)

This invention relates to an apparatus for evaluating the capital appreciation potential of investments and more particularly to apparatus and methods for predicting the future prices of a common stock. The price of common stock, while affected by many factors extrinsic to the particular company whose assets are represented by the stock, nevertheless, over a reasonably long period of time is related to such factors as earnings, dividends, asset value, sales and trading volume. While many analysts employ some of the data in arriving at an estimate of stock prices, it has not been feasible in the past to employ all the variables suggested in arriving at a conclusion. The device of this invention permits the employment of a novel method of evaluating investments so as to provide an estimate of future prices of the securities based on past prices and past data. As employed herein, the term "future prices" is defined as "the most likely high price and low price as a function of the latest available projected earnings, dividends, asset value per share, sales and trading volume, etc."

The apparatus of the present invention derives a formula which determines the estimated future price of a particular stock. This formula follows the form $$P = AV_1 + BV_2 + CV_3 + DV_4 + EV_5 \pm K$$

where P is the price of the stock, $V_1$–$V_5$ are variables and A, B, C, D, and E are multiplying coefficients. In order to arrive at this formula the various coefficients are adjusted until the error or difference between a curve representing the price of the stock over an extended period and a curve representing the formula is reduced to a minimum. Thus a mathematical model which best relates past price history to past economical and financial data is provided for that particular investment. Finally, the mathematical model, or formula, is utilized in cooperation with estimates of the corresponding economic and financial data for the coming year to predict the most likely high and low price of that stock.

This invention is based on the premise that over a period of time the price of a common stock will vary in accordance with certain intrinsic variable, such as earnings, dividends paid, asset value, sales, and trading volume. In accordance with the method of the invention a model is set up showing the variation in stock prices over a period of years. The evaluator is provided with means for generating voltages indicative of each of the above mentioned variables during the period under consideration. Each of these voltages is then multiplied by a coefficient and the products summed. Means are provided for varying the magnitude of the multiplying coefficient, such that the sum of voltages will correspond to the fluctuation in price over the same period. Having thus determined a formula which fits prior years, the high and low stock price for the coming year can be determined from the estimated range of the variables for that coming year.

It is an object of this invention, therefore, to provide an electronic computer which will evaluate a particular stock and indicate a probable future price of the stock.

It is another object of this invention to provide an electronic stock evaluator which utilizes certain past data and projected data relating to a particular stock to furnish an estimate of a future price of the stock.

It is still another object of this invention to provide an electronic stock evaluator including associated circuitry which fits certain specified variables to a predetermined mathematical formula to arrive at the future price of a particular stock.

It is a further object of this invention to provide an electronic stock evaluator which will predict the high and low price of a selected stock during a certain specified future time period.

It is another object of this invention to provide a method for predicting the future price of stocks.

Other and further objects of my invention reside in the structures and arrangements hereinafter more fully described with reference to the accompanying drawings in which:

FIGS. 1A and 1B are representations of portions of a rack mounting panel.

Figure 2A:
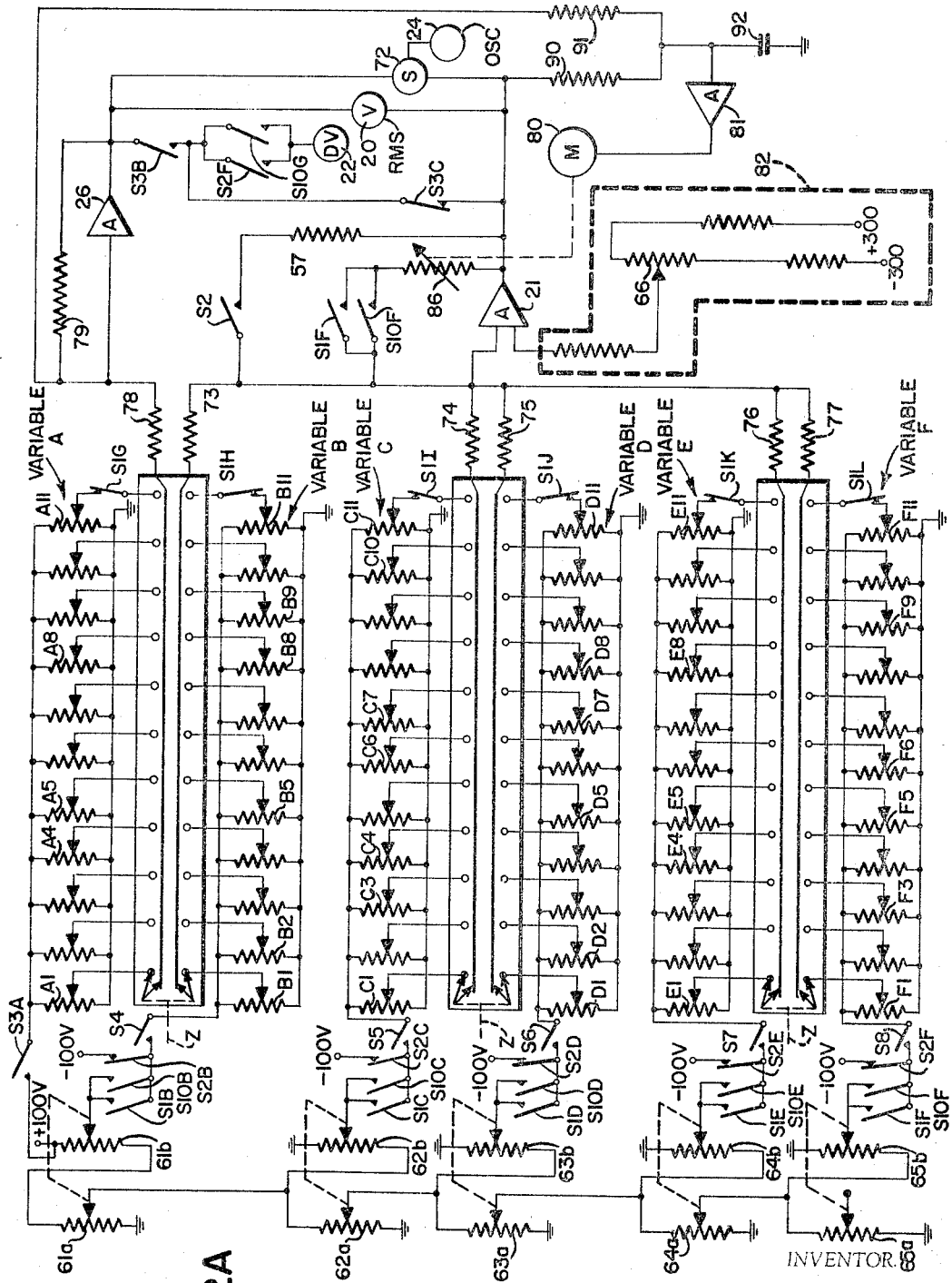

FIGS. 2A in conjuction with FIG. 2B are schematic showings of the circuit of the device.

Figure 3:
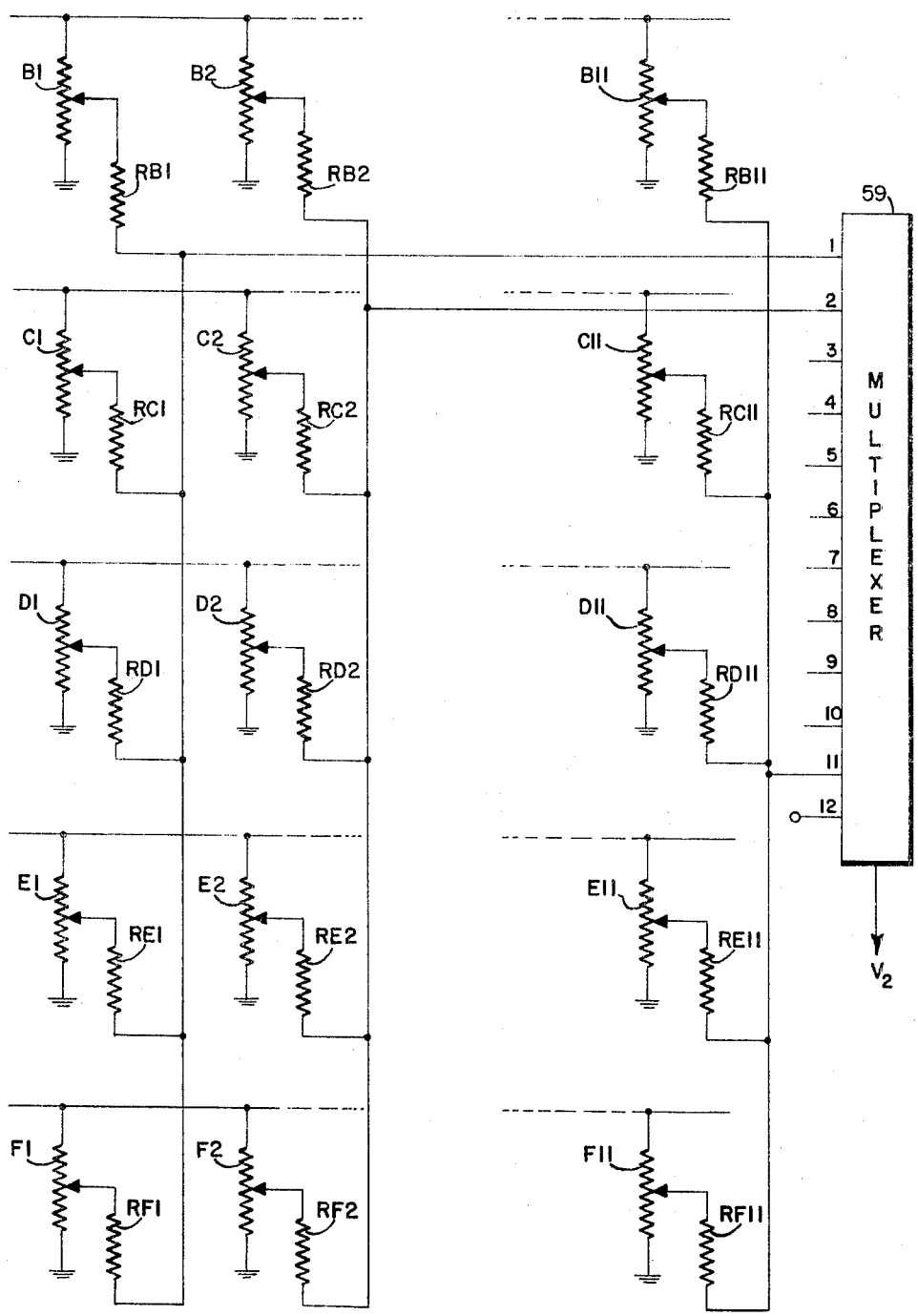

FIG. 3 is an alternate arrangement of a portion of the circuit shown in FIG. 2A.

Referring now to the drawings:

While the method of the invention may be carried out by means of a mechanical model, it is preferred to employ an electronic device, as described more fully hereinafter, because of its simplicity and relatively low cost.

The apparatus may be assembled from conventional instruments commonly employed in the electronics arts, such as amplifiers, R.M.S. voltmeters, digital voltmeters, etc. For convenience, it is preferred to package the apparatus in the rack-type mounting 8 shown in FIGS. 1A, 1B. However, other packaging arrangements such as a console may be employed.

In FIG. 1A there is shown mounted on panel 23 a standard R.M.S. voltmeter 20, a digital voltmeter 22, and a monitor oscilloscope 24. The oscilloscope is provided with conventional focus conntrol 25, vertical position control 26, horizontal position control 27, sweep vernier control 28, vertical attenuator 29, and vertical position control 30. The digital voltmeter is provided with an on-off button 10, sensitivity control 12, polarity control 14, and external terminals 16. The functions of these controls are conventional and well known in the art.

Also located on panel 23 are a series of internally illuminated push buttons. Push button 31 controls the master switch for turning the apparatus on and off; switch 32 places the equipment in a program mode; switch 33 places the equipment in a compute mode; and switch 34 places the equipment in a prediction mode. Adjacent panel 35 is provided with a plurality of variable resistors which serve as gain controls, as will be explained more fully hereinafter.

Referring now to FIG. 1B there is shown mounted on panel 40 a series of vernier multiturn potentiometers A1–A11. In the present embodiment, 10-turn potentiometers are utilized. The potentiometers are provided with a clock-like dial which permits of accurate setting. It will be noted that the panel is labeled "Price Per Share." Also mounted on the panel is an on-off push button SA. For purposes of illustration, the apparatus is shown as provided with means for introducting five variables B–F. This combination of variables is considered to produce the most accurate results under presently existing conditions. However, the number and types of variables may be adjusted to fit the conditions prevalent in any given period of time. Panel 42, adjacent to panel 40, contains a number of banks of multiturn potentiometers B1–B11, C1–C11, D1–D11, E1–E11 and F1–F11. Associated with the respective banks A–F, there is provided an on-off switch SA, SB, SC, SD, SE, and SF, respectively. A commercially available type of switch which is preferred for this purpose employs a translucent plastic push button and contains a pilot light which illuminates the push button when the circuit is energized. Associated with each of the vertical columns of potentiometers, there is provided an indicator light L1–L11.

FIG. 3 shows an embodiment wherein the output or variable terminal of potentiometers B1–B11, C1–C11, etc., for comparable time periods are connected in parallel thus reducing the number of contacts necessary for the operation of the unit.

Operation of the evaluator (1) Button 31 is depressed and switch 35 closes energizing the apparatus through A.C. source 50 (FIG. 2B). The pilot light L51 is energized illuminating the top half of push button 31. It is convenient to arrange for this portion of the push button to be provided with a red filter which will glow in that color when light 51 is energized. A standard power supply 49 is utilized to provide the voltages necessary for the operation of the unit. After a suitable waiting period of say, three minutes, introduced by time delay 53 during which the filaments of the power supply 49 will have been warmed up, the balance of the circuit will be automatically energized, and pilot light L52 will be energized to illuminate the green colored portion of push button 31. It should be noted that R.M.S. voltmeter 20, digital voltmeter 22, and monitor oscilloscope 24, are connected to the power source ahead of time delay 53 so that they have the opportunity to warm up and become stabilized before the computer is operative.

The operator then depresses the program push button 32, closing contact S2G and lighting pilot light L55 which illuminates the button and applies a negative programming voltage to the portion of the evaluator shown in FIG. 2A by closing contacts S2B–S2F. Simultaneously, switch S2 (FIG. 2B) is opened, thereby preventing the unit from automatically scanning and allowing the operator to apply a voltage to each individual potentiometer, as explained more fully below. In addition, switch S2F (FIG. 2A) is closed thereby connecting digital voltmeter 22 to the output of amplifier 21.

The operator next programs earnings per share over the previous ten years. A longer historical period could be provided for if desired. This is accomplished by depressing push button SB thereby energizing the associated circuit by closing contact S4 and illuminating the push button with the corresponding pilot light LB through contact S4A. Then foot switch 56 is depressed momentarily advancing arm 59A of stepping switch 59 until indicator light L1 is illuminated. It will be noted that in the program position, a fixed 1-megohm resistor 57 is shunted across amplifier 21 thereby providing a negative feedback for said amplifier.

Potentiometer B1 is now adjusted until digital voltmeter 22 displays the latest reported annual earnings per share. The foot switch is then depressed advancing the indicator light to the L2 position, where the process is repeated with control potentiometer B2 being adjusted until the next latest annual earnings per share is indicated on the digital voltmeter. The procedure is then repeated until the ten most recent annual earnings per share are programmed into the evaluator utilizing potentiometers B1–B10. The estimated earnings per share for the current year is programmed into the B11 or estimated position. Switch SB is then opened de-energizing light LB. A convenient type of switch is the latching type which is released upon mere touching of the button.

The dividends per share push button SC is then depressed closing S5, energizing that circuit, and illuminating the push button through contact S5A. Foot switch 56 is depressed momentarily advancing arm 59A of stepping switch 59 until indicator light L1 is illuminated, as explained above. The control potentiometer C1 is then adjusted until the digital voltmeter shows the latest annual dividend per share, thereby placing the dividends per share value into the memory unit. The procedure is then repeated until the ten latest dividends per share are programmed into potentiometers C1–C10 in sequence. Next, the estimated dividends per share for the current year is programmed into the C11, or estimated position. The dividends per share push button SC is then unlatched opening the circuit as indicated by the unlighting of the push button bulb LC.

Variable SD push button is then depressed closing switch S6, lighting the push button bulb LD through contact S6A, and energizing the circuit. As shown, the apparatus is arranged so that the annual sales of the company constitute the variable D. The procedure outlined above is now repeated so that the annual sales for the prior ten years and the estimated sales for the current year are programmed into the memory. The variable SD push button is then depressed de-energizing bulb LD unlighting the push button.

The variable E or asset value per share push button is then depressed closing switch S7 lighting its push button bulb LE through contact S7A and energizing its circuit such that the digital voltmeter displays the variable E value; the foot switch 56 is now used to select the particular potentiometer being employed for memory. Using the variable E potentiometers E1–E11, the asset value per share for the ten latest years is programmed in sequence into positions 1–10 using the previously explained procedure. The estimated asset value per share per current year is stored by means of potentiometer E11. The variable E push button is now unlatched disconnecting the foot switch from the stepping circuit.

The same procedure is now repeated using the variable F push button which is used to insert the annual trading of shares over the last ten years. Bulb LF is lighted when contact S8A closes as a result of the activation of S8. Potentiometers F1–F10 are used for this purpose. Potentiometer F11 is used to insert the current trading level of the stock.

Finally the variable A or price per share button SA is depressed closing contacts S3A, S3B and S3C, thereby applying the output of amplifier 26 to digital voltmeter 22. Simultaneously, switch S3C is opened disconnecting the output of amplifier 21 from the digital voltmeter 22. The same procedure is then followed as in the five previous operations.

The evaluator is now fully programmed.

Computation mode

The compute push button 33 is now depressed completing the circuit to bulb L60 through contact S1G thereby illuminating that push button and connecting the outputs of the amplifiers 21 and 26 to R.M.S. voltmeter 20. Since switches S2F and S10G are open in this mode the digital voltmeter 22 is disabled.

Panel 35 carries a series of gain controls 61–65. Reference to FIG. 2A will show that these controls are actually two section ganged variable resistors designated 61A, 61B–65A, 65B. These gain controls allow the operator to adjust the multiplier of variables B, C, D, E, and F, to produce an output signal that represents a minimal difference between the price per share signal and the sum of the multiplied variable data signals. The gain controls are connected into the circuit when the compute switch is energized closing contacts S1B–S1F. Simultaneously, contacts S1G–S1L are opened thereby disconnecting the estimated values represented by potentiometers A11–F11. A sixth gain control 66, also located on panel 35 varies the bias of the amplifier and introduces the constant K into the price formula. It is connected through a resistor to amplifier 21, as shown in FIG. 2A. K provides for such factors as the value of the "good name" of a company which cannot be found in the financial statement but can be measured by adjusting K for the optimum fit of the curve.

It will be noted that no connection is shown to the variable arm of 65 (FIG. 2A) since this is the final resistor in the series. Thus for convenience and symmetry, the arm is left in the unit and the lead merely disconnected so that the operation of the arm will have no electrical effect.

As the variable B, variable C, variable D, variable E, and variable F controls are sequentially adjusted for minimum readings on R.M.S. voltmeter 20, it will be noted that the output from the variable B, variable C, variable D, variable E, and variable F memory circuits are fed in parallel, through grid resistors 73–77, to amplifier 21. Amplifier 21 may be a standard computer operational amplifier which is connected to one of the pair of input terminals of the R.M.S. voltmeter 20. The output of the Price Per Share memory is fed to the other of the pairs of input terminals of R.M.S. voltmeter 20 through grid resistor 78 and a second standard computer operational amplifier 26. Resistor 79 provides negative feedback for the amplifier. Thus a differential reading is obtained between the programmed formula and the corresponding Price Per Share A.

In the computation mode, switches S10 and S2 are both closed. The stepping switch relay 59 is always in an energized condition so that scanning or sampling of the contacts will be continuous. The scanning rate is sufficiently high that a reading is obtained on the R.M.S. voltmeter. The stepping switch is arranged so that in the predict mode the switch S10 is open and the stepping switch will advance until it reaches the 11th position or contact 59B at which time it will become de-energized so that the entire set of scanning switch contacts will be in position to sample the predicted values of the inserted data.

In the drawing, the sampling means shown as a stepping switch 59 comprises a number of gangs coupled together as indicated by the dashed lines marked "Z."

One convenient way of presenting the price fluctuation curve is by displaying it on an oscilloscope. This is accomplished by means of a stepping switch which sequentially scans a memory, having stored therein the year by year price data, in synchronism with the oscilloscope sweep, thereby presenting a curve. Simultaneously, the stepping switch sequentially scans the memory positions in which are stored the corresponding historical data and by means of an electronic switch circuit, a second curve is simultaneously presented showing the calculated curve.

The monitor oscilloscope 24 is used to visually monitor the evaluator computer cycle. The adjustment of the compute controls for minimum readings on R.M.S. voltmeter 20 will also cause the two sets of lines representing matched curves on the monitor oscilloscope to come closer together. The distance between each pair of lines represents the differential readings explained hereinabove. It will be noted that each of the lines is representative of either the price memory or of the sum of the other variables each multiplied by its coefficient, the coefficient being represented by the voltage developed by each of the corresponding resistors 61A, 61B–65A, 65B. The vertical sweep circuits of oscilloscope 24 are connected alternately between the outputs of amplifier 26 and amplifier 21 so as to provide a comparison between the two outputs. This is accomplished by means of electronic switch 72. The oscilloscope also shows the presence of a failure in an evaluator circuit by the omission of a line or portion thereof.

In the compute mode of operation, potentiometer 86 is shunted across amplifier 21 through contact S1F, thereby affording a negative feedback which is adjusted by said potentiometer. Potentiometer 86 is controlled in turn by servomotor 80, fed by the output of servo amplifier 81, which adjusts the negative feedback so as to provide a self-balancing operation which balances the output of the variables not being adjusted at that time. Thus the operator may, for example, adjust the output of one variable for a minimum without having to go back and readjust the outputs of the other variables which, without the incorporation of the self-balancing circuit, would go out of alignment each time another variable is adjusted. It can be appreciated, therefore, that a great saving in time and complexity of operation is thereby effected.

It should be noted that network 82 introduces a bias for amplifier 21 which may be adjusted by potentiometer 66 to allow for an additional variable not included in the stock evaluating variables ordinarily utilized; for example, the Consumer Price Index or the foreign dollar exchange rate. Provision can also be made for unforeseen events such as the serious illness of the President which event can cause stock market prices to take a sudden dip. This would have a temporary effect of a certain magnitude on the price of a stock which would be mitigated by the passage of time when integrated into the overall trend of a stock for a term of years. The mitigated result could be taken into account by adjusting network 82 which, in effect, varies the curve represented by the formula upon which the operation of the present invention is based, as explained more fully below.

It should be noted that the components of RC network 90, 91, and 92 are selected to provide a time constant slightly greater than the scan time. This keeps the servomotor from responding before the computation of each function has been completed.

Predict mode

At this point, the computation has been completed and the operator pushes the predict push button 34, energizing pilot light L83 and illuminating the push button through contact S10H. The predicted low price per share for the current year is then displayed on the digital voltmeter 22.

When predict button 34 is depressed, switch S10 is opened and the variable B, C, D, E, and F memory functions are energized. Since S10 is now open it can be seen that at the completion of one cycle the scanning operation will terminate because the scanning arm 59A comes to rest on the unconnected contact 59B thereby disconnecting the return for the scanning circuit. Depressing predict button 34 also connects the digital voltmeter 22 into the circuit and places potentiometer 86 in parallel with amplifier 21 which provides negative feedback for the amplifier, through contacts S10G and S10F, respectively. Contacts S10B–S10F are now positioned to allow the unit to automatically scan the various values that have been computed. The value for each constant having been computed, the unit multiples the variable for each particular function for a future time period, such as estimated earnings per share for the coming year, and adds the product of that variable and constant to that of the other products, thereby defining the formula $$P = AV_1 + BV_2 + CV_3 + DV_4 + EV_5 \pm K$$

The constant K would be the value of the bias fed to amplifier 21 through network 82, if this were necessary. P represents the predicted estimate of the price of the stock for the coming year based on the estimated values of the variables for the coming year, or other time period that the unit has been adjusted for.

The computation is now completed and the predicted low price per share for the current year is read on the digital voltmeter.

The apparatus may now be connected to predict the high price per share for the current year. This is accomplished by utilizing the potentiometers A1–A10, as in determining the low price per share above, and by inserting the high price per share for the ten latest years. The compute button is then depressed and the variable B–variable F controls adjusted sequentially for minimum readings on the R.M.S. voltmeter. The predict button is then depressed to show the predicted high price per share for the next twelve months on the digital voltmeter.

In FIG. 3 there is shown another embodiment of the invention wherein instead of the multiplexer switching to the various memories B, C, D, E, and F, and then summing the outputs, the vertical columns of memories are tied together in parallel employing isolating resistors RB1, RB2 . . . RB11–RF1, RF2 . . . RF11. Thus the B1, C1, D1, E1 and F1 memories are tied together. Likewise, the B2–F2 memories are tied together in sets. The parallel circuits are fed to the multiplexer. This embodiment has the advantage over the circuit shown in FIG. 2A in reducing the number of switching contacts required. On the other hand, for the five variables shown an additional 50 isolating resistors are required.

It will be appreciated that the system described hereinabove automatically integrates into the estimations all of the factors that have influenced the price of the stock being evaluated over the period of time being utilized. For example, the rising cost of living, depreciation of the value of the dollar, and increasing buying power, are extrinsic factors that may affect the price of stock. In addition, it can be seen that the present invention integrates into its computations the various parameters utilized for a period of time based on what a party believes will be the conditions existing in the future. For example, if a severe depression, such as the depression of the 1930's, or an exerntal conflict such as the Korean conflict of the early 1950's occurred, the present invention could utilize the parameters existing during the depression of the 1930's, the Korean conflict of the 1950's, or any other period of time comparable to the condition existing in the present time, to compute the behavior of the stock. It can be seen, too, that if it was believed that a war of a depression was going to occur in the near future, an estimate of the behavior of the stock for that period could be established by using parameters existing during comparable periods of time in the history of the stock.

The disclosure of the invention has been directed to a description of its use with respect to common type stock securities. This has been done solely for convenience of explanation and ease of understanding, since dealings in such securities are believed to be well known. However, the scope of the inventive disclosure is not to be deemed to be so limited. Rather, it has broader and more general application. It may be employed to provide evaluations of commodity futures as well as evaluations of general business information, the results of which may have a bearing on the future decisions of the business organization so affected permitting them to use such evaluations for advantageous financial investment and business decisions.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

What is claimed is:

1. A stock share price computer comprising:
a source of potential;
a plurality of price data storage potentiometers each provided with a pair of fixed terminals and a variable terminal, said potentiometers having their fixed terminals connected across said source of potential;
sampling switch means arranged to sequentially sample each of said variable terminals to provide a first signal;
a first amplifier arranged to amplify said first signal and provide a first output signal;
a plurality of networks, each of said networks including a plurality of potentiometers having fixed terminals connected in common and a variable terminal connected to said sampling switch;
first potential varying means connecting said networks to a source of potential, said first potential varying means being adapted to vary the potential applied to its associated network, at least some of said networks having a second potential varying means interposed in series between said first potential varying means and source of potential;
whereby as a first potential varying means is adjusted in a direction tending to reduce the potential applied to its associated network the said second potential adjusting means coupled thereto is varied in a direction tending to increase the potential applied to its said associated networks;
means for summing the outputs of the adjustable potentiometers for a given time period to provide a summed signal;
adjustable amplifying means for multiplying the summed signal and providing a second output signal;
means for continuously comparing the first output signal with said second output signal and providing a control signal;
means responsive to said control signal for adjusting said adjustable amplifying means in a direction tending to adjust said second output signal to the same level as said first output signal; and
means for measuring said second output signal.

2. The apparatus of claim 1 wherein said means responsive to said control signal is a motor coupled to a variable resistance arranged to vary the feedback of said adjustable amplifier so as to thereby vary the amplification of said summed signal.

3. The apparatus of claim 1 wherein said control signal responsive means has a time constant greater than the time required for said sampling switch to sample the plurality of potentiometers.

4. The apparatus of claim 1 wherein said means for measuring said second output signal is a digital voltmeter arranged to be selectively connected to said apparatus so as to alternatively receive said first and said second output signals.

5. The apparatus of claim 1 including an R.M.S. voltmeter arranged to receive said first and said second output signals so as to indicate the R.M.S. difference between them while the sampling switch continuously samples the said potentiometers.

6. The apparatus of claim 1 including:
an electronic switch arranged to alternatively sample said first and said second output signals; and
an oscilloscope arranged in cascade with said electronic switch for displaying simultaneously said first and said second output signals.

7. The apparatus of claim 1 including means for selectively placing said sampling switch means in one of a continuous scan mode and a single step mode.

8. A stock share price computer comprising:
a source of potential;
a plurality of price data storage potentiometers each provided with a pair of fixed terminals and a variable terminal, said potentiometers having their fixed terminals connected across said source of potential;
sampling switch means arranged to sequentially sample each of said variable terminals to provide a first signal;
a first amplifier arranged to amplify said first signal and provide a first output signal;
a plurality of networks, each of said networks including a plurality of potentiometers each representative of a given time period and having fixed terminals connected in common and a variable terminal;
means connecting all the variable terminals for a given time period to a common function;
means associated with said sampling switch for sequentially sampling the said common junction for each time period;
first potential varying means connecting said networks to a source of potential, said first potential varying means being adapted to vary the potential applied to its associated network, at least some of said networks having a second potential varying means interposed in series between said first potential varying means and source of potential;

whereby as a first potential varying means is adjusted in a direction tending to reduce the potential applied to its associated network the said second potential adjusting means coupled thereto is varied in a direction tending to increase the potential applied to its said associated networks;

means for summing the outputs of the adjustable potentiometers for a given time period to provide a summed signal;

adjustable amplifying means for multiplying the summed signal and providing a second output signal;

means for continuously comparing the first output signal with said second output signal and providing a control signal;

means responsive to said control signal for adjusting said adjustable amplifying means in a direction tending to adjust said second output signal to the same level as said first output signal; and means for measuring said second output signal.

9. The apparatus of claim 8 wherein said means responsive to said control signal is a motor coupled to a variable resistance arranged to vary the feedback of said adjustable amplifier so as to thereby vary the amplification of said signal.

10. The apparatus of claim 8 wherein said control signal responsive means has a time constant greater than the time required for said sampling switch to sample the plurality of potentiometers.

11. The apparatus of claim 8 wherein said means for measuring said second output signal is a digital voltmeter arranged to be selectively connected to a said apparatus so as to alternatively receive said first and said second output signals.

References Cited by the Examiner

"Building Block Simplicity," Donner Model 3000 Analog Computer, (4 pp.—copy in Group 240).

"Electronic Analog Computers," Korn and Korn, 2nd Edition 1956, (McGraw-Hill Book Co., Inc.) pages 284–285, especially.

MALCOLM A. MORRISON, *Primary Examiner.*

DARRYL W. COOK, A. J. SARLI, *Assistant Examiners.*